Figure 8:
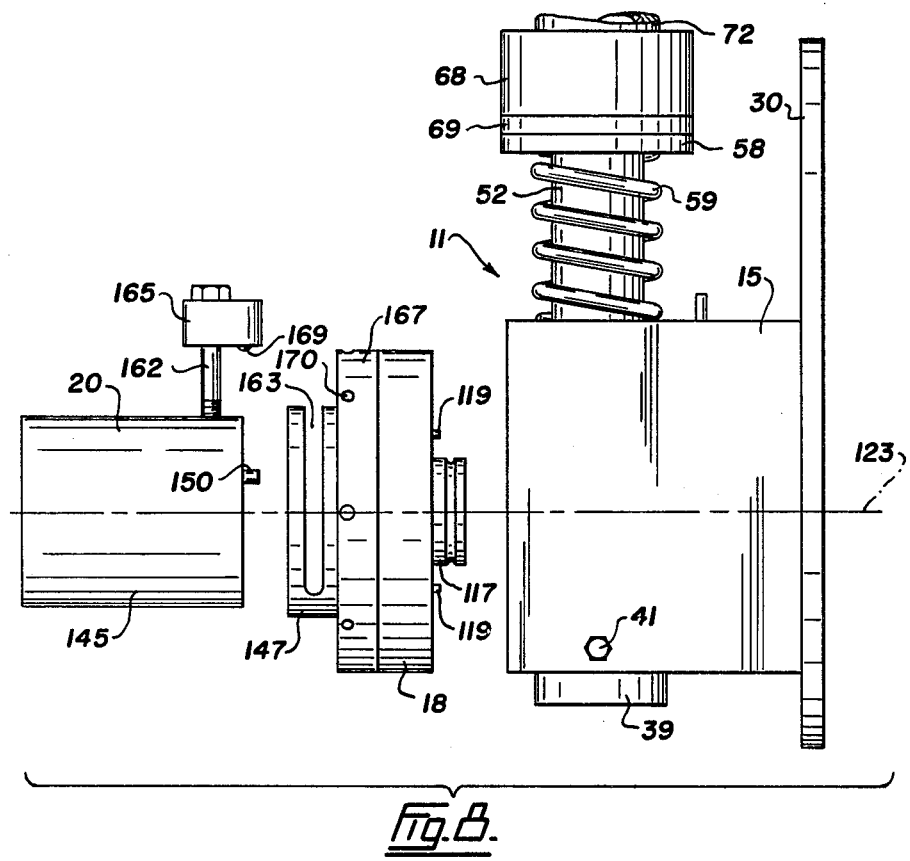

United States Patent [19]

Raitt

[11] 4,152,079

[45] May 1, 1979

[54] APPARATUS FOR MIXING LIQUID AND THICK LIQUID-LIKE PRODUCTS

[76] Inventor: Edward D. Raitt, 5525 Blenheim St., Vancouver, British Columbia, Canada, V6N 1P6

[21] Appl. No.: 833,357

[22] Filed: Sep. 14, 1977

[51] Int. Cl.² .......................... B01F 5/06; B01F 15/02
[52] U.S. Cl. ..................................... 366/155; 222/135; 366/196
[58] Field of Search ............... 366/154, 155, 169, 172, 366/165, 182, 194, 195, 196; 222/135, 226, 229, 236, 237

[56] References Cited

U.S. PATENT DOCUMENTS

| 1,855,548 | 4/1932 | Forster | 366/169 |
| 2,273,835 | 2/1942 | Cornell | 366/169 |
| 2,510,955 | 6/1950 | Brown | 366/194 |
| 2,974,830 | 3/1961 | Hood | 222/135 |

Primary Examiner—Robert W. Jenkins
Attorney, Agent, or Firm—Fetherstonhaugh & Company

[57] ABSTRACT

Apparatus for dispensing thick liquid-like products in comparatively small amounts while simultaneously mixing therewith an appropriate amount of a selected one of several liquids. An instant and thorough mixing is accomplished by directing the product into a spinning cup while at the same time directing thereinto the selected liquid. The cup has a side wall close to but spaced from the wall of a dispensing passage in which the cup is located thereby forming a narrow annular mixing passage therebetween. The cup wall has orifices therein through which the product material and the liquid are flung by centrifugal force, the liquid and product being instantly and thoroughly mixed by this action and by spinning travel through the mixing passage.

35 Claims, 10 Drawing Figures

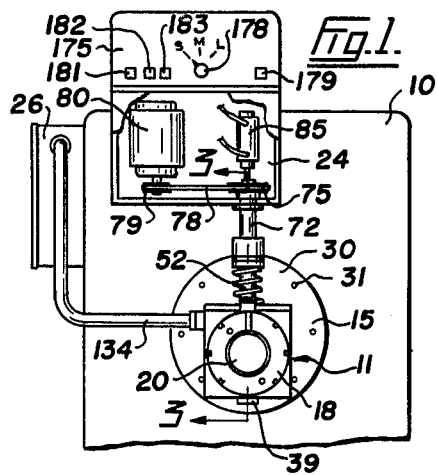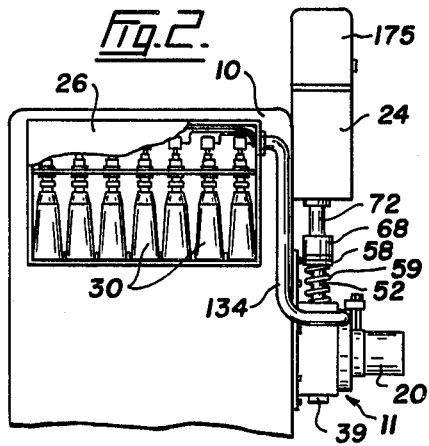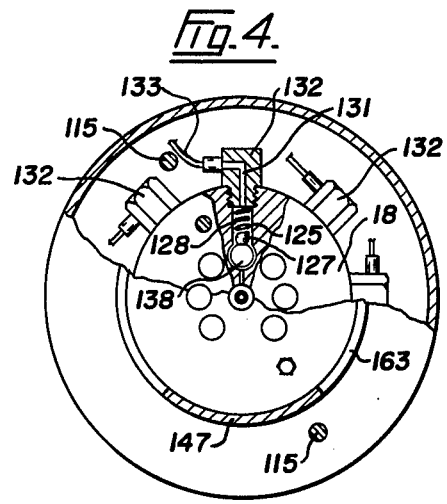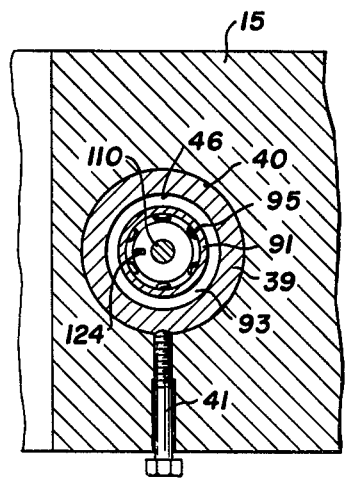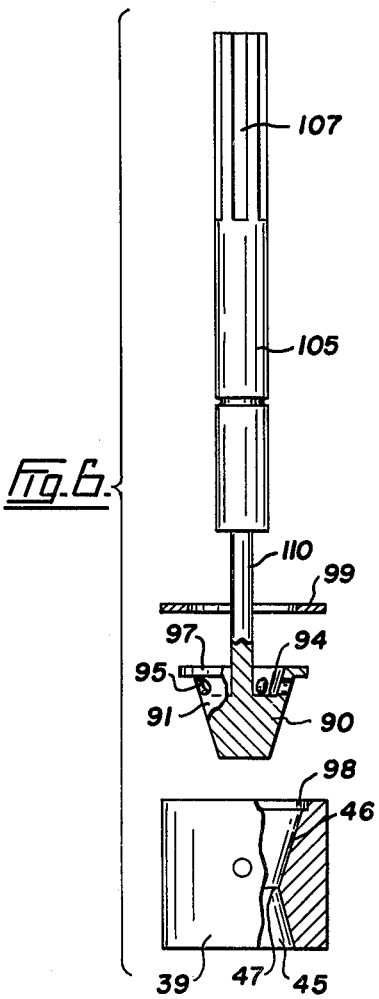

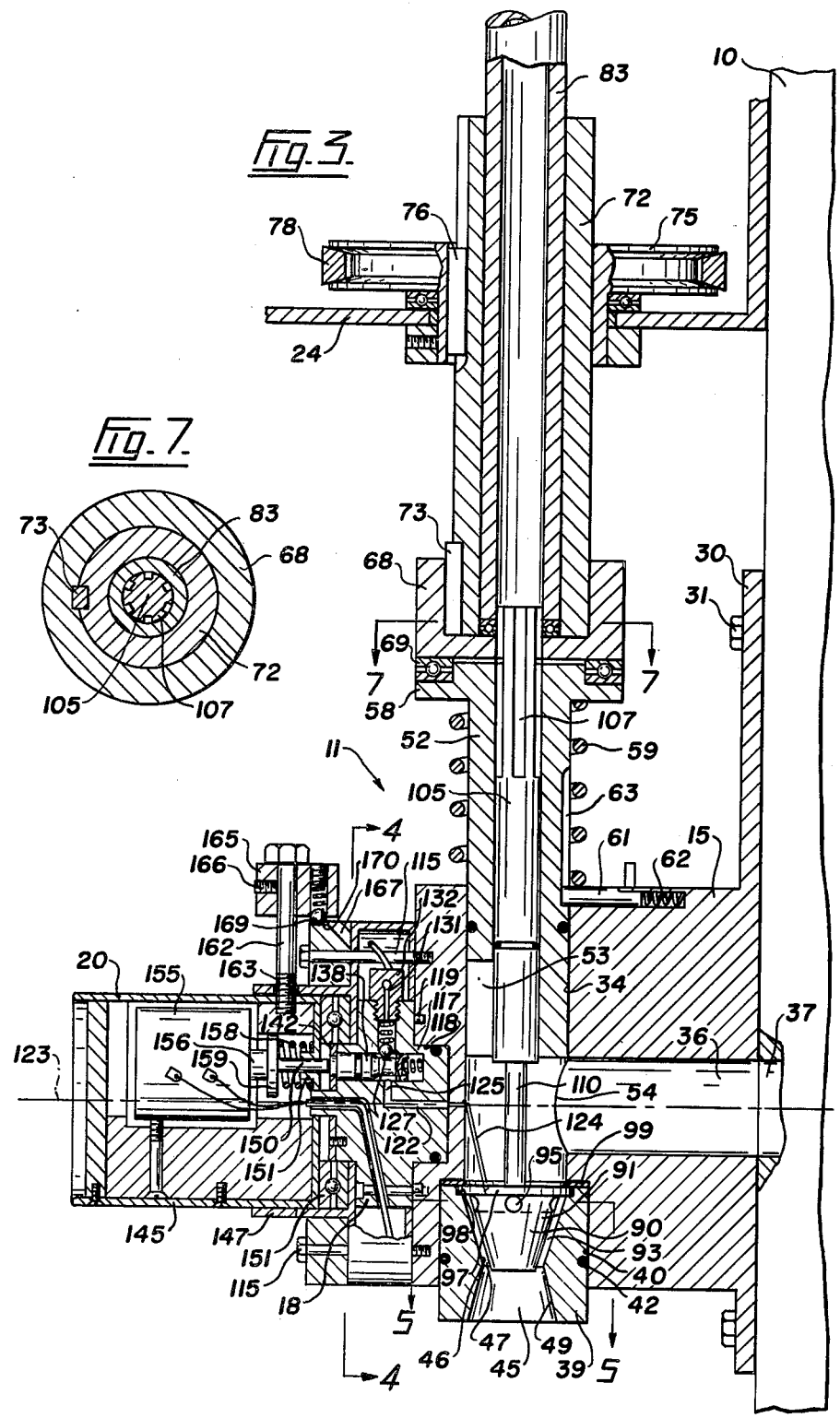

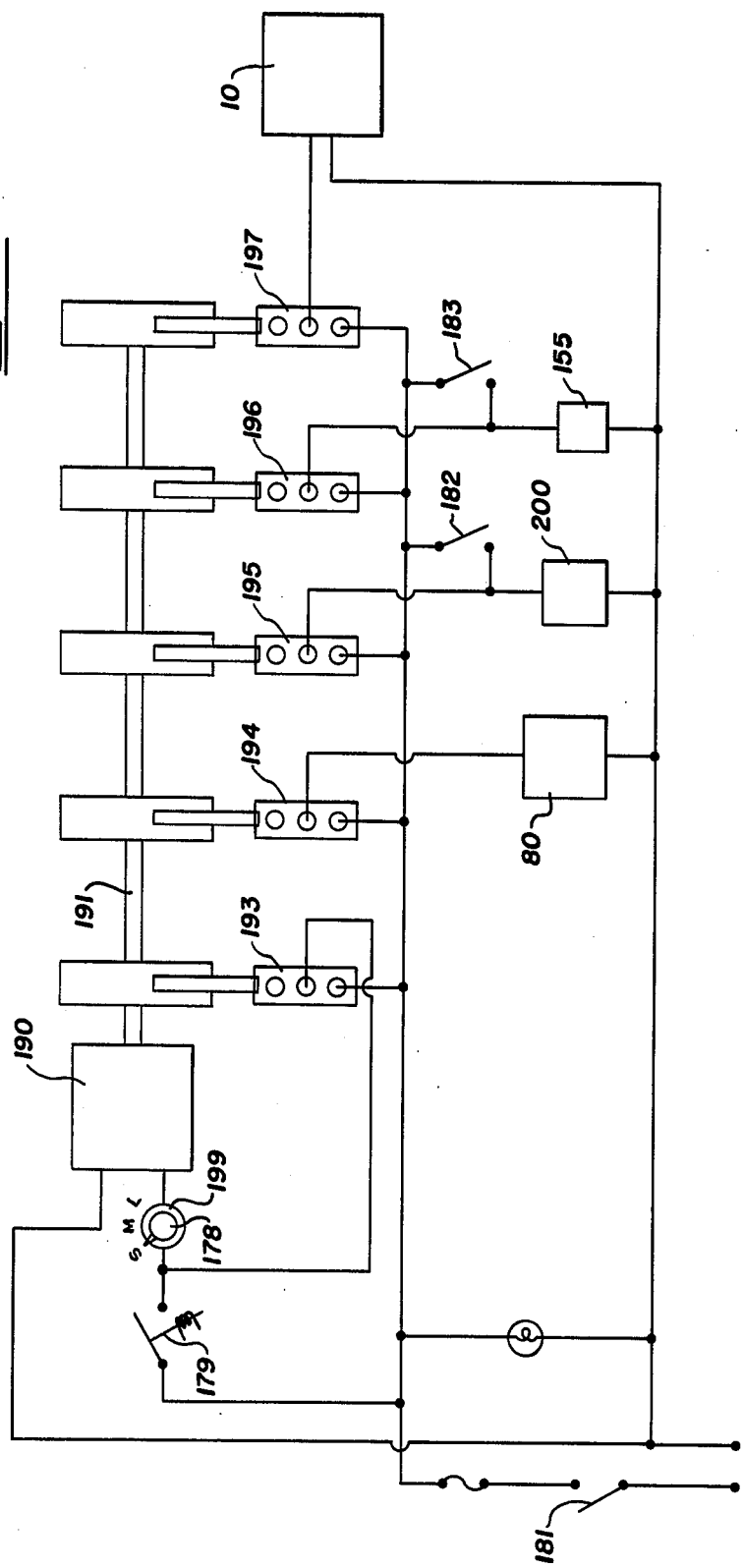

APPARATUS FOR MIXING LIQUID AND THICK LIQUID-LIKE PRODUCTS

This invention relates to apparatus for mixing liquid and thick liquid-like products during dispensing thereof in relatively small amounts. Although this machine may be used for mixing many different types of liquids and relatively thick products, it is particularly designed for mixing thick liquid-products such as ice cream and yogurt with flavouring liquids, and it will for the sake of convenience be described herein relative to ice cream.

What is known as hard ice cream is sold is many different flavours, but soft ice cream is sold in one flavour only, usually vanilla. The main reason or this is that soft ice cream is dispensed as it is produced into containers such as edible cones and dishes. There is no practicle apparatus on the market for mixing different flavouring liquids into soft ice cream as it is being dispensed.

The apparatus of the present invention makes it possible when dispensing soft ice cream or the like to select any one of several flavouring liquids and to instantly and thoroughly mix the selected liquid with the ice cream as it is being dispensed.

The heart of this apparatus is a spinning cup in a dispensing passage and having a wall close to but spaced from the wall of the passage to form a narrow annular mixing passage therebetween. This cup has a plurality of orifices the wall thereof facing in the direction of the mixing passage wall. During each dispensing operation, a predetermined amount of the product being dispensed, such as soft ice cream, is directed into the cup while the latter is spinning. At the same, an appropriate amount of a selected flavouring liquid is directed into the material in the spinning cup. Centrifugal force throws the product containing the liquid laterally out of the cup, and this action creates a mixing of the two substances. The mixture is subjected to a shearing action as it spins through the mixing passage surrounding the cup so that the mixing of the two is very thorough and is accomplished almost instantly, the time being only the time the product or ice cream takes to flow into and from the cup to and through the annular mixing passage. In other words, there is practically no hesitation in the flow of the ice cream from the ice cream machine to the receptacle, such as a cone or dish.

It is preferably to have the wall of the dispensing passage at the cup substantially in inverted conical form with the cup correspondingly shaped.

Apparatus in accordance with this invention comprises a dispensing passage having an annular wall and an outlet at one end, a cup rotatable in said passage and having a side wall spaced from the passage wall forming a passage therebetween, said cup wall having orifice means therein opening towards the passage wall, means connected to the cup for spinning said cup, first supply means for directing a thick liquid-like product into the cup, and second supply means for directing a liquid into the thick product in the cup, said liquid and said product being mixed during discharged thereof through the orifice means under the action of centrifugal force.

Figure 9:
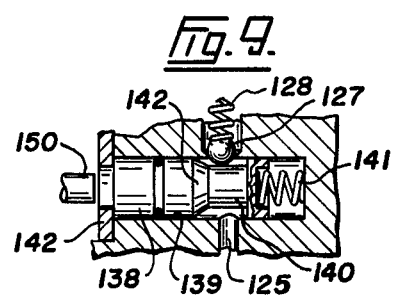

A preferred form of the invention is illustrated by way of example in the accompanying drawings, in which:

FIG. 1 is an elevation of a front end of a soft ice cream machine with this mixing apparatus mounted thereon, FIG. 2 is a side elevation of the mixing apparatus on the ice cream machine, FIG. 3 is an enlarged sectional view taken on the line 3—3 of FIG. 1, FIG. 4 is a vertical section taken on the line 4—4 of FIG. 3, FIG. 5 is a fragmentary cross section taken on the line 5—5 of FIG. 3, FIG. 6 is an exploded view of the mixing cup and associated parts of this apparatus, FIGS. 4, 5 and 6 being located on the sheet containing FIGS. 1 and 2, FIG. 7, located on the sheet containing FIG. 3, is a cross section taken on the line 7—7 of FIG. 3, FIG. 8 is an exploded side elevation of this apparatus, FIG. 9 is an enlarged fragmentary sectional view of a check valve arrangement in the liquid supply section of the apparatus, and FIG. 10 is a wiring diagram of a control system for this apparatus.

Referring to the drawings, 10 is a standard soft ice cream machine with mixing apparatus 11 according to this invention mounted thereon. The ice cream machine 10 usually has a dispensing mechanism thereon through which varying amounts of ice cream are dispensed. The operator starts the machine and directs the required amount of ice cream into an ice cream cone, dish or other receptacle. The regular dispensing apparatus of the machine has been removed and mixing apparatus 11 substituted therefor. However, the machine retains its start-stop system.

The overall mixing apparatus 11 includes a body 15, a control valve unit 18 mounted on said body, a selector unit 20 rotatably mounted on the control unit, a casing 24 above the main body, and a container 26 for holding a plurality of self-pressurized bottles 30 containing different flavouring liquids. In this example, casing 24 is mounted on the front of machine 10, while container 26 is mounted on the side thereof as shown in FIGS. 1 and 2.

FIGS. 3 to 9 illustrate the mixing and dispensing apparatus 11 in detail. The main body 15 of the apparatus has at one end a plate 30 which replaces the usual plate of the dispensing apparatus of ice cream machine 10. Plate 30 is secured to the machine by easily removed bolts 31. A substantially vertical dispensing passage 34 extends through body 15 and intersects a substantially horizontal supply passage 36 which extends away from said dispensing passage and opens out of the body in registry with the outlet passage 37 of ice cream machine 10. A block 39 removably fits in a socket 40 in the main body and is retained therein by a set screw 41, see FIGS. 5 and 8. A sealing or O-ring 42 fits in a groove in the side of block 39 and presses against the wall of socket 40. Block 39 has a passage 45 therethrough which is aligned with dispensing passage 34 and actually constitutes the lower end thereof. Although dispensing passage 45 may be of cylindrical cross section, it preferably has a wall 46 substantially in the form of an inverted truncated cone with an outlet 47 at the apex or lower end thereof. This passage 45 may also have a lower wall section 49 which diverges downwardly. Outlet 47 actually constitutes the outlet or lower end of dispensing passage 34 as well as of the dispensing passage 45.

A plunger 52 is slidably mounted in passage 34 and is shown in FIG. 3 in its upper portion with its lower end 53 above the supply passage 36. A vertical slot 53 is cut in the side of plunger 52 at the lower end thereof. The end 54 of passage 36 forms an inlet for passage 34. The plunger 52 is movable to a lower position, at which time it closes inlet 54. A head 58 is formed on the upper end of plunger 52 and spring means in the form of a coil spring 59 lies between this head the upper surface of main body 15 and biases the plunger into its upper position, at which time the inlet 54 is open. A horizontal pin 61 is slidably mounted in body 15 and is urged by a spring 62 into a vertical groove 63 in the side of plunger 52 to prevent the plunger from rotating around its vertical axis while allowing it to reciprocate vertically. A socket 68 rests on head 58 and a bearing 69 carried by the latter. A tubular drive shaft 72 fits in socket 68 and projects upwardly therefrom, and is drivingly connected thereto in any suitable manner, such as by means of a key 73. This drive shaft extends upwardly into casing 24 and is connected to a drive pulley 75 in any desired manner, such as by means of a key 76 and pulley set screws which allows vertical movement of the drive shaft when the unit is being installed. Pulley 75 is connected by a belt 78 to another pulley 79 on the drive shaft on an electric motor 80 mounted in casing 24, see FIG. 1.

A tubular plunger shaft 83 extends through shaft 72 and rests at one end of the bottom of socket 68, this shaft 83 projecting upwardly beyond the upper end of shaft 72 to a hydraulic cylinder 85 mounted in casing 24. Shaft 83 is connected to the piston rod, not shown, of cylinder 85 so that when said cylinder is energized to extend the piston rod thereof, shaft 83 moves downwardly moving socket 68 and plunger 52 in the same direction, thereby closing supply inlet 54. The stroke of cylinder 85 is such as to cause plunger 52 to close and open supply inlet 54. When cylinder 85 is energized to retract its piston rod, spring 59 moves plunger 52 to open inlet 54.

A mixing cup 90 is positioned in the lower section or extension passage 45 just below inlet 54 of the dispensing passage 34. If the dispensing passage in block 39 is cylindrical in cross section, cup 90 is cylindrical in cross section, but when the passage wall 46 is in the form of an inverted cone, the cup is correspondingly shaped, and the wall 91 of the cup is close to but spaced from passage wall 46 to form an annular mixing passage 93 therebetween, see FIGS. 3 and 5. The lower end of the cup is located in the passage outlet 47, and the cup has a shallow inner bottom 94, see FIG. 6. Suitable opening means is provided in wall 91 of the cup, and in this example a plurality of orifices 95 are formed in the wall near bottom 94 and open in the direction of wall 46 into mixing passage 93. A flange 97 on the upper end of the cup rests in an annular recess 98 in the upper end of block 39, and a washer 99 between block 39 and the upper end of recess 40 overlies this flange, see FIG. 3, but there is sufficient clearance to allow the cup to rotate at high speed. This flange 97 maintains the spacing between the cup wall 91 and the passage wall 46, and washer 99 prevents vertical movement of the cup.

A cup drive shaft 105 is secured at its lower end to the bottom 94 of cup 90, see FIG. 6, and projects upwardly into and through plunger 52. The upper end of shaft 105 extends through the bottom of socket 68 and into plunger shaft 83. The cup shaft is drivingly connected to socket 68 through splines 107 which permit the socket, shaft 83 and plunger 52 to move up and down relative to the cup shaft 105. Shaft 105 is preferably formed with a reduced section 110 at its lower end in the area of inlet 54 so as to permit easy flow of ice cream from supply passage 36 through dispensing passage 34 and into cup 39.

Valve unit 18 is mounted on the outer end of body 15 in any suitable manner for easy removal for cleaning purposes, such as by means of bolts 115 which extend through the unit and are threaded into the main body, as shown in FIG. 3. Unit 18 has a central spigot 117 projecting therefrom into a correspondingly shaped recess 118 in the body 15 while pins 119 projecting from this unit fit into corresponding holes in body 15 to ensure the proper positioning of these elements relative to each other. While passages 34 and 36 form means for supplying ice cream to cup 90, the control valve unit 18 forms part of another supply means for directing flavouring liquids or the like into said cup. The control valve unit 18 has a common passage 122 located on a horizontal axis 123 which extends centrally through the valve unit and selector unit 20. One end of passage 122 communicates with an upper end of supply pipe or tube 124 which extends downwardly through dispensing passage 34 and has a lower end terminating at the upper end of mixing cup 90. The opposite end of passage 122 communicates with a plurality of radiating passages 125, see FIGS. 3, 4 and 9, there being one of these radiating passages for each flavour liquid to be selectively mixed with ice cream in the cup. Each radiating passage 125 has a check valve 127 therein which is normally retained closed by a spring 128 mounted in an enlargement of the passage. The outer end of each passage 125 communicates with another passage 131 in a fitting 132 screwed into valve unit 18, the opposite end of passage 131 being connected to a thin tube 133 which extends, along with similar tubes from the other passages 125 of the valve unit, through a common conduit 134 to and into container 26 where it is removably connected to the outlet end of one of the bottles 30 therein. Thus there is a passageway extending from each of the bottles 30 to the common central passage 122 which, in turn, is connected to tube 124, the latter being very small in cross section, something of the order of a hypodermic needle. There is a check valve 127 in each of these passageways.

Operating means is provided for selectively opening any one of the check valves 127 to allow liquid to flow through the passageway of said selected valve and tube 124 into the mixing cup. Part of the operating means comprises a valve plunger 138 for each passage 125 in valve unit 18 and slidable in a horizontal bore 139 extending across said passage 125, see FIG. 9. Each plunger 138 has a reduced portion 140 normally at the adjacent ball check valve 127, said plunger being retained in this position by a spring 141 bearing against the inner end of the plunger. A removable face plate 142 stops each plunger 138 from being pushed out of bore 139. The check 127 projects a little into bore 139 when the valve is closed, and an inclined shoulder 142 on plunger 138 unseats the valve when the plunger is moved inwardly of the bore 139.

Selector unit 20 includes means for selectively moving any one of the plungers 138. In this example, the selector unit is in the form of a horizontal housing 145 of circular cross section mounted to rotate around axis 123. The inner end of the housing projects into and is rotatably mounted within a sleeve 147 projecting outwardly from valve unit 18. A horizontal operating plunger 150 is slidably mounted in a suitable bearing 151 in the inner end of housing 145, this operating plunger being parallel to but radially spaced from axis 123. This plunger is so positioned that it may be moved into line with any of the valve plungers 138. Operating plunger 150 has an outer end normally spaced from the adjacent end of valve unit 18, and suitable means is provided for selectively causing the operating plunger to move outwardly of the housing to engage and depress the valve plunger 138 with which it is aligned at the time.

Suitable means is provided for operating plunger 150, and in this example, a solenoid 155 is provided in the housing for this purpose. The core 156 of the solenoid either constitutes the operating plunger 150 or, as shown in FIG. 3, is connected to the outer end of the operating plunger. When the solenoid is energized, plunger 150 is moved outwardly therefrom, and when the solenoid is de-energized, a spring 158 between a shoulder 159 on the solenoid core and the inner end of housing 145 moves the operating plunger in the opposite direction towards the solenoid.

The housing 145 of selector unit 20 is rotatably around axis 123 to bring the operating plunger 150 into line with any of the valve plungers 138. Suitable means is provided for stopping and retaining the operating plunger in line with the selected valve plunger. In this example, a relatively long bolt 162 extends through a slot 163 in sleeve 147 and is threaded into housing 145. This bolt retains the housing in the sleeve, and it carries a block 165 releasably retained thereon by a set screw 166. This block extends inwardly over the portion 167 of valve unit 18 and carries a spring-loaded detent ball 169 which projects outwardly therefrom and is adapted to fit into depressions 170 in the valve unit portion 167. There is a depression 170 for each of the valve plungers 138. When the detent ball sits into a selected depression 170, the operating plunger 150 of the selector unit is aligned with the valve plunger 138 associated with the selected depression. As housing 145 is rotated around axis 123 the detent ball rides on the surface of unit portion 167 and travels into and out of the depressions until the rotation of the housing is stopped. When the detent ball fits into one of the depressions, the houing 145 is releasably retained in position, and operating plunger 150 is aligned with one of the valve plungers 138.

The controls for apparatus 11 are mounted within an upper section 175 of casing 24. The standard ice cream machine 10 does not have its own controls for dispensing predetermined amounts of ice cream during each operation, but this apparatus does. A switch 178 is shown in FIG. 1 for selecting the amount of ice cream to be dispensed during each dispensing operation. For example, the predetermined amounts may be "small" "medium" or "large." Switch 178 is electrically connected to a selecting mechanism of the apparatus 11 for this purpose. A "start" bottom 179 is momentarily depressed when it is desired to start apparatus 11. Switch 181 is a main power "on-off" switch. Switches 182 and 183 are provided for manually controlling cylinder 85 and solenoid 155, respectively. FIG. 10 diagrammatically illustrates, by way of example, an electrical control system for this apparatus, which is hereinafter described. When start button 179 is depressed, motor 80 is electrically energized and hydraulic cylinder 85 is hydraulically energized for predetermined times. The motor spins cup 90 for a predetermined time, while cylinder 85 lifts plunger 52 to open the supply inlet 54 for the predetermined time. Button 179 also causes selector solenoid 155 to be energized to cause the operating plunger 150 to move outwardly to shift the valve plunger 138 aligned therewith to open the adjacent check valves 127 for a predetermined time. After the predetermined time, cylinder 85 is again energized to move plunger 52 downwardly against the pressure of spring 59.

When it is desired to dispense some ice cream into a container, such as an ice cream cone or dish, switch 178 is turned to select the amount to be dispensed. The housing 145 of the selector unit 20 is rotated to select a flavouring to be directed into the ice cream being dispensed. Then start switch 179 is momentarily depressed to electrically energize motor 80 and solenoid 155 and to hydraulically energize cylinder 85. This preferably is done in sequence so that cup 90 starts to spin as plunger 52 is lifted to open inlet 54. At the same time, the depression of switch 179 starts the ice cream machine 10 to operate and it directs ice cream through passage 36 into dispensing passage 34 and thence into the spinning cup 90. The depression of the selected valve plunger 138 opens the adjacent check valve 127 to allow the selected flavour to travel through central passage 122 and tube 124 into the ice cream in the spinning cup. The spinning action of the cup mixes the flavouring with the ice cream in the cup at the same time throws the ice cream under centrifugal force through orifices 95 into mixing passage 93. The outer surface of the cup causes the ice cream to spin through passage 93 so that by the time the ice cream reaches outlet 47 the flavouring is thoroughly mixed therewith. The ice cream flows through the outlet into the waiting container. At the end of the predetermined time, motor 80 and solenoid 155 are de-energized, cylinder 85 is energized to operate in the opposite direction, and the operation of machine 10 is stopped. The actual timing of this is such that plunger 52 is moved downwardly to close inlet 54 while the cup is still spinning. As the plunger moves downwardly, tube 124 enters the plunger slot 53. The plunger moves the ice cream in passage 34 downwardly into the cup while the spinning action thereof causes this ice cream to spin through mixing passage 93 so that all of the ice cream in the dispensing passage 34 and the cup is dispensed.

Apparatus of this type needs to be cleaned each day. This is easily accomplished by the following procedure. Control valve unit 18 is removed by unscrewing bolts 115, and is preferably hung in a safe and clean spot. Face plate 30 is released by removing bolts 31 and, while the bottom portion of body 15 is being held, socket 68 is depressed until it clears drive shaft 72. The body 15 and the parts associated therewith are removed to a wash container or sink, after which pin 61 is depressed to allow plunger 52 to be removed. Set screw 41 is loosened so that block 39, ring 99 and cup 90 with its attached shaft 105 can be removed and then washed. All channels or passages in body 15 are cleared for washing purposes.

FIG. 10 is a wiring diagram of an example of an electrical control system for apparatus 11 and the ice cream machine 10. A variable speed motor 190 drives a shaft 191 upon which are mounted the cams or micro switches 193 to 197. A speed control unit 199 is provided for motor 190 and is controlled by switch 178. A hydraulic flow control solenoid 200 is provided for hydraulic cylinder 185. When solenoid 200 is energized, cylinder 85 operates to raise plunger 52 and when this solenoid is de-energized, cylinder 85 moves the plunger downwardly.

The apparatus is turned on for operation by closing a power off-on switch 181. A selection of the portion size to be dispensed is made by turning switch 178, and unit 199 controls the speed of cam shaft 191 to determine the length of the dispensing cycle. Switch 179 is momentarily depressed, causing cam shaft 191 to rotate enough to switch the micro switch 193 to the closed position. As long as this switch is closed cam motor 190 is energized. This switch is opened after one complete revolution of the shaft, thereby determining the overall length of the cycle. The cams of switches 194 to 197 are shaped to give the order and length of activation of each of the functions involved in the dispensing operation. Switch 194 controls the cup drive motor 80, switch 195 provides power for the operation of plunger 52, and switch 196 provides power for the flavour selecting solenoid 155. Switch 182 allows for the independent retraction of plunger 52 to enable disconnection of body 15 for cleaning. Switch 183 allows for the manual energization of solenoid 155. This allows the flavour passages or tubes to be individually cleaned by the the substitution of a pressurized bottle of water for the flavour container 30 in any given selected position. Micro switch 197 replaces the normal start-stop switch of the soft ice cream machine.

Although the various elements of apparatus 11 may be of any desired size, the following dimensions are given as an example of a satisfactory machine. The cup 90 may be 1 inch across at its upper end, and about ½ inch across at its lower end. The total height of the cup is ¾ of an inch and the cavity thereof above bottom 93 can have a capacity of about 5 milliliters. It has been found that a very thorough mixing can take place by spinning the cup at about 2000 rpm. without damaging the texture of the dispensed ice cream.

What I claim is:

1. Apparatus for mixing liquid in a thick liquid-like product during dispensing thereof, comprising
   a dispensing passage having an annular wall and an outlet at one end,
   a cup rotatable in said passage and having a side wall spaced from the passage wall forming a passage therebetween, said cup wall having orifice means therein opening towards the passage wall,
   means connected to the cup for spinning said cup,
   first supply means for directing a thick liquid-like product into the cup, and
   second supply means for directing a liquid into the thick product in the cup,
   said liquid and said product being mixed during discharged thereof through the orifice means under the action of centrifugal force.

2. Apparatus as claimed in claim 1 in which said cup wall is close to but spaced from the passage wall to form a narrow annular mixing passage therebetween, said liquid and product being further mixed during spinning travel through the mixing passage.

3. Apparatus as claimed in claim 2 in which said dispensing passage is substantially in the form of an inverted cone with said outlet at the apex end thereof, and said cup is correspondingly shaped.

4. Apparatus as claimed in claim 2 in which said orifice means comprises a plurality of spaced orifices in the cup wall adjacent an upper end thereof.

5. Apparatus as claimed in claim 4 in which said orifices are located adjacent a rim of the cup.

6. Apparatus as claimed in claim 2 comprising a plurality of containers holding different liquids, and delivery means for selectively directing any of said different liquids to said cup.

7. Apparatus as claimed in claim 2 comprising means for stopping and starting the flow of said product through said first supply means to the cup.

8. Apparatus as claimed in claim 7 comprising a plurality of containers holding different liquids, and delivery means for selectively directing any of said different liquids to said cup while said product is flowing to the cup.

9. Apparatus as claimed in claim 1 in which said second supply means comprises,
   a supply pipe extending into the dispensing passage and down towards the cup and having a lower end near said cup, said pipe having an upper entrance end,
   a plurality of individual supply passages connected to the entrance end of the pipe,
   a normally-closed check valve in each individual supply passage and openable away from the supply pipe, said supply passages being connectable to containers holding different liquids, and
   operating means for selectively opening any one of said check valves to allow liquid to flow through the supply passage of said one check valve and through the supply pipe into the cup.

10. Apparatus as claimed in claim 9 in which said supply passages with their respective check valves are positioned around and radiate from a common axis, and said operating means comprises,
    a valve plunger for and near each check valve, said plungers extending substantially parallel to said axis and being longitudinally reciprocal,
    a shoulder on each plunger for contacting and opening the check valve of said each plunger when the latter is moved in one direction,
    spring means normally biasing the shoulder of each plunger away from the adjacent check valve, and
    means for selectively moving any one of said plungers to cause the shoulder thereof to open the adjacent check valve.

11. Apparatus as claimed in claim 10 in which said moving means comprises,
    a reciprocal operating plunger mounted to be selectively movable into alignment with any one of said valve plungers, and
    means connected to the operating plunger operable to move the latter against the valve plunger with which said operating plunger is aligned to open the adjacent check valve.

12. Apparatus as claimed in claim 11 in which said operating plunger comprises solenoid core, and said moving means comprises a solenoid for said core.

13. Apparatus as claimed in claim 12 in which said valve plungers are arranged in a circle around said axis, and said solenoid and core are mounted in a support mounted to revolve around said axis, said core being so positioned that it aligns with the valve plungers as said support is rotated around said axis.

14. Apparatus for mixing liquid in a thick liquid-like product during dispensing thereof comprising,
    a dispensing passage having an annular wall near a lower end thereof and an outlet at said end,
    a cup having an open upper end and rotatably in the passage near the outlet thereof and having a side wall spaced from the passage wall,
    orifice means in the cup wall and opening towards the passage wall,
    means connected to the cup for spinning said cup in the dispensing passage, an inlet into the dispensing passage above the cup through which a thick liquid-like product can be directed into the passage and thence into the cup, a supply pipe extending into the passage and down towards the cup, said pipe having a lower end near said cup upper end, and means for directing a liquid to and through said pipe and into said product in the cup, said liquid and said product being mixed during discharged thereof through the orifice means under the action of centrifugal force.

15. Apparatus as claimed in claim 14 in which said cup wall is close to but spaced from the passage wall to form a narrow annular mixing passage therebetween and into which said orifice means opens, said liquid and product being further mixed during spinning travel through the mixing passage.

16. Apparatus as claimed in claim 15 in which said dispensing passage is substantially in the form of an inverted cone with said outlet at the apex end thereof, and said cup is correspondingly shaped.

17. Apparatus as claimed in claim 15 comprising valve means in the dispensing passage operable to close and open said inlet of the passage.

18. Apparatus as claimed in claim 17 in which said inlet is in the wall of the dispensing passage near the upper end of the cup, and said valve means comprises a plunger in the dispensing passage and movable down to the upper end of the cup simultaneously to close said inlet and move any product in said passage into the cup, and up to open the inlet.

19. Apparatus as claimed in claim 18 comprising a shaft extending through and rotatable in said plunger, said cup being secured to a lower end of the shaft, and connecting means for connecting an upper end of the shaft to power drive means.

20. Apparatus as claimed in claim 19 in which said shaft is movable longitudinally of said shaft, and comprising a radial flange on the cup fitting in a corresponding groove in the dispensing passage wall normally preventing downward movement of the cup.

21. Apparatus as claimed in claim 20 in which the portion of the dispensing passage in which the cup is located is formed in a removable block, and including means releasably securing said block in operative position.

22. Apparatus as claimed in claim 15 in which said directing means for the liquid comprises a plurality of containers holding different liquids and delivery means for selectively directing any of said different liquids to the supply pipe.

23. Apparatus as claimed in claim 15 in which said orifice means comprises a plurality of spaced orifices in the cup wall adjacent an upper end thereof.

24. Apparatus for mixing liquid in a thick liquid like product being dispensing thereof, comprising a main body, a substantially vertical dispensing passage in and extending through the body and having an upper end and a lower outlet end opening out from the body, a supply passage in the body and extending to and communicating at one end with the dispensing passage through an inlet in a wall of said dispensing passage above the lower end thereof, said supply passage having an opposite end opening out from the body to be connected to a source of a thick liquid-like product, a cup having an open upper end and rotatable in the passage near the outlet end thereof and having a side wall close to but spaced from the passage wall forming a narrow annular mixing passage therebetween, said cup receiving the liquid-like product from the supply and dispensing passages, a plunger in the dispensing passage movable longitudinally towards and away from the cup to close and open said inlet, a cup shaft extending longitudinally through and rotatable in the plunger and connected at a lower end to the cup to spin said cup, said shaft being mounted for relative longitudinal movement within the plunger, said shaft having an upper end to be connected to a power source, orifice means in the cup wall and opening into said mixing passage, supply means for directing a liquid into the thick product in the cup, said liquid and said product being mixed during discharged thereof through the orifice means under the action of centrifugal force and spinning travel through the mixing passage to the dispensing passage outlet end.

25. Apparatus as claimed in claim 24 in which the portion of said dispensing passage in which the cup is located is substantially of inverted cone shape with the apex end thereof forming the dispensing passage outlet end, and said cup is correspondingly shaped.

26. Apparatus as claimed in claim 24 including a block releasably mounted in the body at the dispensing passage and having a passage therethrough constituting part of the dispensing passage at the outlet end thereof, said cup being positioned in the portion of the dispensing passage within the block.

27. Apparatus as claimed in claim 26 in which the portion of said dispensing passage in which the cup is located is substantially of inverted cone shape with the apex end thereof forming the dispensing passage outlet end, and said cup is correspondingly shaped.

28. Apparatus as claimed in claim 26 in which said cup is removable upwardly from the dispensing passage in the block, and including means for releasably preventing said relative upward movement from the block.

29. Apparatus as claimed in claim 24 comprising a head connected to an upper end of the plunger above the main body, spring means between the head and the body biasing the plunger upwardly to open said inlet, a socket rotatable on the head and through which the upper end of the shaft projects, means connecting the socket to the shaft while permitting movement of the socket longitudinally of the shaft, a drive shaft, means connecting the drive shaft to the socket while permitting movment of the socket longitudinally of the drive shaft, drive means on the drive shaft, a tubular plunger shaft in and extending longitudinally of the drive shaft, the upper end of the cup shaft extending into the plunger shaft, power means connected to an upper end of the plunger shaft to longitudinally reciprocate said plunger shaft to cause longitudinal movement of the plunger.

30. Apparatus as claimed in claim 24 in which said liquid supply means comprises, a control valve unit mounted on the main body, a main passage in the control unit, a tube extending from one end connected to the main passage into the dispensing passage and terminating in an opposite end above the cup, a plurality of individual supply passages in the control unit connected to the main passage therein and radiating therefrom, a normally-closed check valve in each individual supply passage and openable away from the supply pipe, said supply passages being connectable to containers holding different liquids, and operating means for selectively opening any one of said check valves to allow liquid to flow through the supply passage of said one check valve and through the supply pipe into the cup.

31. Apparatus as claimed in claim 30 in which said main passage coincides with an axis through the control unit, and said operating means comprises, a valve plunger retained in the control unit for and near each check valve, said plungers extending substantially parallel to said axis and being longitudinally reciprocal, a shoulder on each plunger for contacting and opening the check valve of said each plunger when the latter spring means normally biasing the shoulder of each plunger away from the adjacent check valve, and means for selectively moving any one of said plungers to cause the shoulder thereof to open the adjacent check valve.

32. Apparatus as claimed in claim 31 in which said moving means comprises a reciprocal operating plunger mounted to be selectively movable into alignment with any one of said valve plungers, and means connected to the operating plunger operable to move the latter against the valve plunger with which said operating plunger is aligned to open the adjacent check valve.

33. Apparatus as claimed in claim 32 in which said operating plunger comprises solenoid care, and said moving means comprises a solenoid for said core.

34. Apparatus as claimed in claim 33 in which said valve plungers are arranged in a circle around said axis, and comprising, a support mounted on said control unit for rotation around said axis, said solenoid and core being mounted in the support, and said core being so positioned that it aligns with the valve plungers as said support is rotated around said axis.

35. Apparatus as claimed in claim 34 including means for releasably retaining the support against rotation when the solenoid core is aligned with each valve plunger.

* * * * *